United States Patent [19]

Ma

[11] Patent Number: 4,741,001

[45] Date of Patent: Apr. 26, 1988

[54] PEDOMETER STOP WATCH

[76] Inventor: Robert Ma, No. 10-1, Lane 295, Sec. 3, Tson Tsen North Rd., Taipei City, Taiwan

[21] Appl. No.: 859,067

[22] Filed: May 2, 1986

[51] Int. Cl.<sup>4</sup> ............................................. G01C 22/00
[52] U.S. Cl. ................................... 377/24.2; 364/561; 368/10; 368/165; 377/20
[58] Field of Search ...................... 377/5, 20, 24, 24.2; 235/95 C, 105; 368/134, 165, 179, 10; 324/166, 171; 73/490; 364/561

[56] References Cited

U.S. PATENT DOCUMENTS

| 4,332,609 | 3/1982 | Kato | 235/105 |
| 4,334,190 | 6/1982 | Sochaczevski | 324/171 |
| 4,337,529 | 6/1982 | Morokawa | 377/5 |
| 4,510,485 | 4/1985 | Tahara | 377/5 |

FOREIGN PATENT DOCUMENTS

| 141679 | 5/1979 | Japan | 377/5 |
| 189509 | 11/1983 | Japan | 235/105 |
| 202016 | 11/1984 | Japan | 235/105 |

Primary Examiner—John S. Heyman
Attorney, Agent, or Firm—Ladas & Parry

[57] ABSTRACT

The substantial structure of this invention consists of an intensive mechanical swing device and a group of electronic circuits situated in a small-size box body. The swing device features a highly balanceable and sophisticated pendulum designed to absorb the natural swing energy of a human body during running. While the pendulum is swinging, a microswitch will turn on or off to transmit every signal to an IC where precise number of running steps is calculated. In the surface of the box body, a hanging ear is equipped so that the device can be hung on the waist. On the face of the box body is a display and four control keys are equipped to control and lay out all the designed functions of this invention.

7 Claims, 6 Drawing Sheets

PEDOMETER STOP WATCH

BACKGROUND OF THE INVENTION

Jogging is a kind of sport suitable for people of various ages and of various body types for a long-term exercise. However, the viewpoints of the sporting medical science indicate that careful attention must be paid to assure a proper balance in line with the physical state even if it is a slow, mild sport and to keep it as a successive, everlasting exercise.

Therefore, it is necessary to have an accurate measure of the time and distance and the calories consumed for an exercise. Currently, there are many simply designed jogging watches. However, the structure of such watches is so inferior that they tend to break easily and work inaccurately. This is because of a design based on incorrect theory.

The present invention uses a mechanical structure which is sophisticated enough to absorb shock. It is also equipped with an electronic IC so that jogging or walking distance can be precisely calculated.

SUMMARY OF THE INVENTION

The design theory of this invention is that a group of pendulums, in a highly balanceable and sophisticated mechanical structure is used. These parts make use of the energy of natural swing from a man who is jogging or walking, thus resulting in the parts swinging. The present invention also includes a group of microswitches and an electronic IC panel equipped to respond to the actions of the pendulum and calculate accurate times.

With respect to the operational functions of this invention, the average step distance of each jogging or walking step may be pre-set into the memory of the IC panel. After a person's body movement, the invention can calculate the jogging or walking distance along with displaying the number of steps taken. Further the consumed calories is also counted out so as to adjust the physical capacity of individual exercisers' performance.

This invention may be placed on a waist belt or on the top of a pair of trousers. Beyond the above functions, the present invention is capable of many other functions, such as keeping the month, day, hour, minute, second and week acts as an alarm, and as a stop watch, etc.

BRIEF DESCRIPTION OF THE DRAWING

FIG. 3-1: Embodiment of Used Spring of the Pendulum
FIG. 3-2: Same as above
FIG. 3-3: Same as above

DESCRIPTION OF PREFERRED EMBODIMENT

Figure 1:
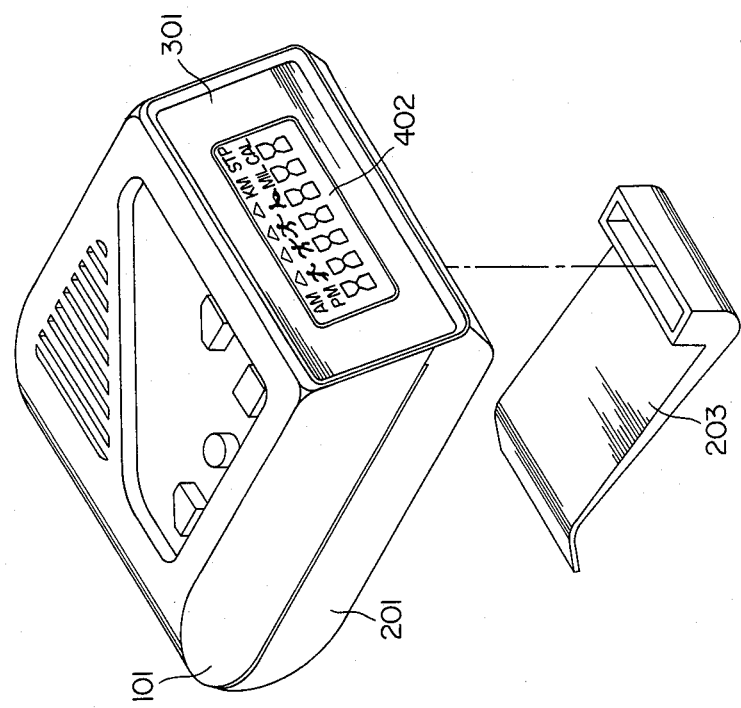
FIG. 1: Layout of Preferred Embodiment

The preferred embodiment of this invention is designed in the form of a box-type body as shown in FIG. 1. The body is composed of an upper cap (101) and a lower cap (201). At the top of the lower cap (201), is a proturberant strut (202) which may be erected (see FIG. 3A) and engaged with a hanging ear (203) by supersonic welding so that a jogger or walker may hang this invention at the waist belt. Alternatively, the hanging ear may be replaced by a wristwatch-type belt for wearing near the hand or by a necklace for wearing on the neck, or by a belt head.

Figure 2:
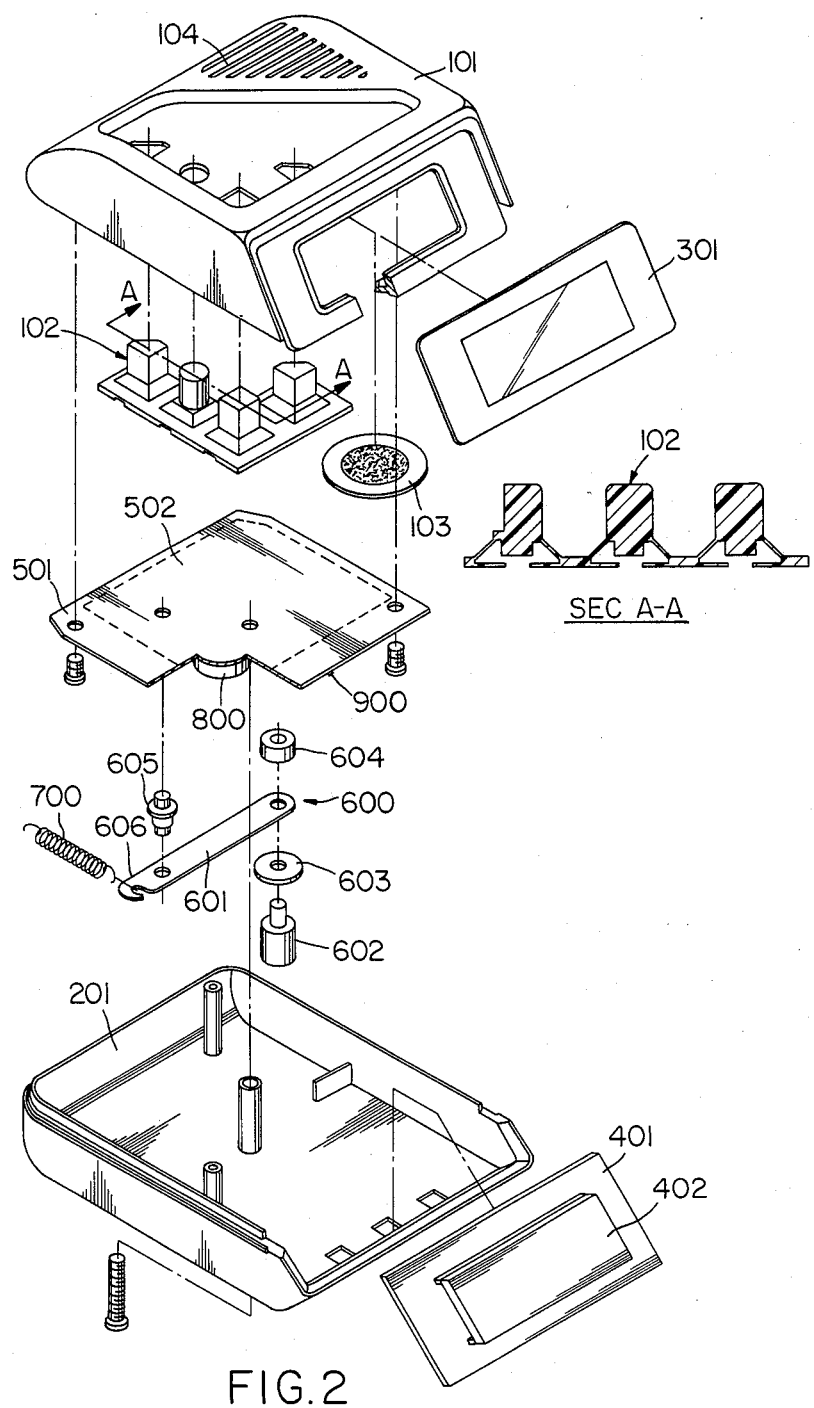
FIG. 2: Vertical Section of the Components

As shown in FIG. 2, a transparent board (301) is equipped in the front between the upper cap (101) and the lower cap (201) to protect the display (402) on the base board (401).

A circuit board (501) is equipped between the upper cap (101) and the lower cap (201) and locked into the upper cap (101) by a screw.

On the face of the above circuit board (501) is the configuration of electronic circuitry (502) and a pendulum is locked at the bottom side. The pendulum (600) includes a swing rod (601) carrying a drill hole to lock the pendulum wheels (602), (603) and (604). The said group of pendulum wheels is capable of keeping precise balance. The swing function works by means of the swing rod (601) of the pendulum (600) which is fixed to the circuit board (501) by the fixing bolt (605). The hanging ear (606) is located at the top of the swing rod (601) of the pendulum (600) and is hooked up by the spring (700).

Figures 1, 3:
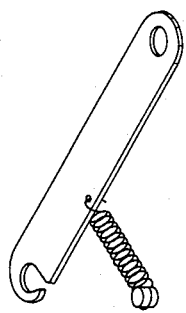
FIG. 3: Perspective View
Figures 2, 3:
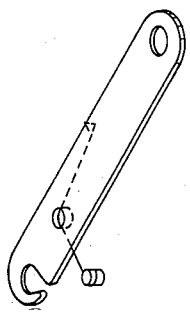
Figure 3:
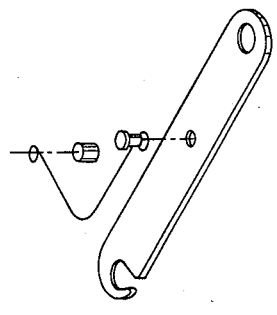
Figure 3:
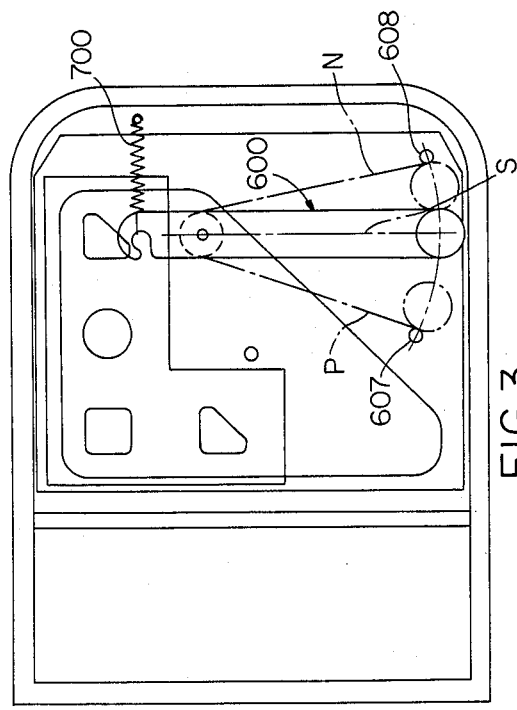
Figure 3A:
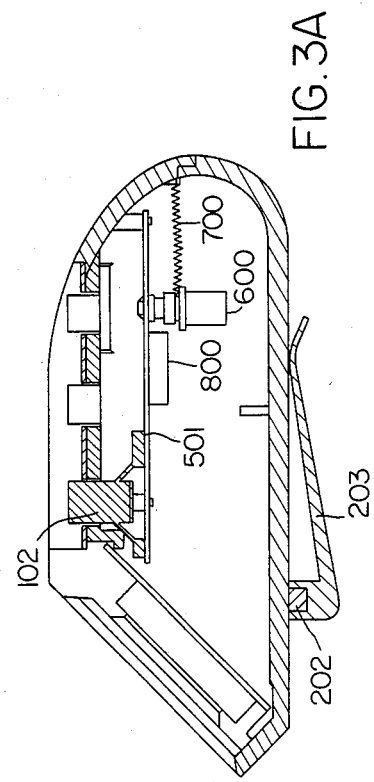
FIG. 3A: Sectional View

As shown in FIG. 3, upon shaking and immediately after one end of the spring (700) is hooked up to the protuberant strut on the edge of the upper cap (see FIG. 3A), the swing wheel of the pendulum (600) will be forced to swing from the static point (S) to the raising point (P). When pendulum (600) abuts positioning rod (607), it will return to point (N) and touch the positioning rod (608), thereby forming a conductive circuit for signal output.

The pendulum will keep swinging as long as there there exists an external force from shaking. Otherwise, it will be pulled back by the spring (700) and held at the static point (S).

A variety of working methods may be applied to the above spring (700) to attain same function as shown in FIGS. 3.1, 3.2 and 3.3.

Figure 4:
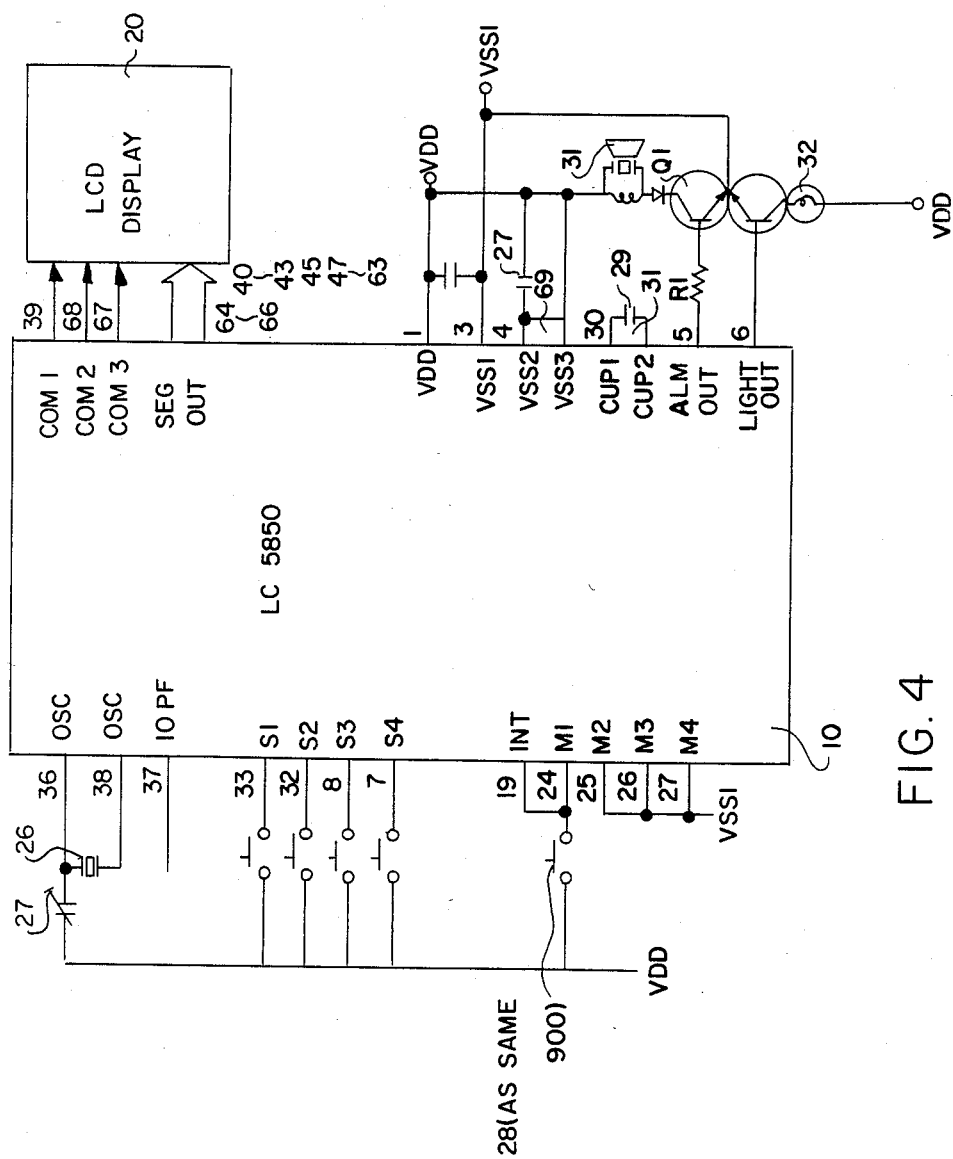
FIG. 4: Circuitry

At the bottom side of the circuit board (501) in FIG. 2, a battery seat may be equipped to fill in the mercury cell (800). The microswitch (900) is designed to have one end connected to the positioning rod (608) and the other end joined to the positioning bolt (605), so that the pendulum (600) can swing, and activate the microswitch (900) only under a sufficiently strong shake and thus cause an input of the circuit signal. Under this design, any lesser shake is absorbed by the spring (700), thereby avoiding any miscaculation. The microswitch (900) is the same as microswitch (28) of FIG. 4.

The aforesaid microswitch (900) is connected to the entire circuit. The circuit on the the circuit board (501) may be controlled by the key (102) exposed in the upper cap (101). SECA-A is the sectional view of the key and the beeper (103) is glued inside the fencing board (104) of the upper cap (101).

The following details the configuration of the electronic circuits of this invention.

The elctronic device of this invention is composed of a single-chip, 4-bit microprocessor (10) and a liquid-crystal display driver (20). The microprocessor (10) works under a low voltage (1.5–4.5 V) and uses a tiny amount of current to produce voltage in the front and back electrode screen of the liquid-crystal display driver and thus makes the rod molecular of the liquid crystal rearrange in response to the magnetic action.

After the rearrangement, a cyclic light function is made possible to enable the area of the liquid-crystal display driver to display words and marks. The microprocessor (10) is manufactured by Sanyo Electric Co., LTD. Model number LC 5850.

Figure 5:
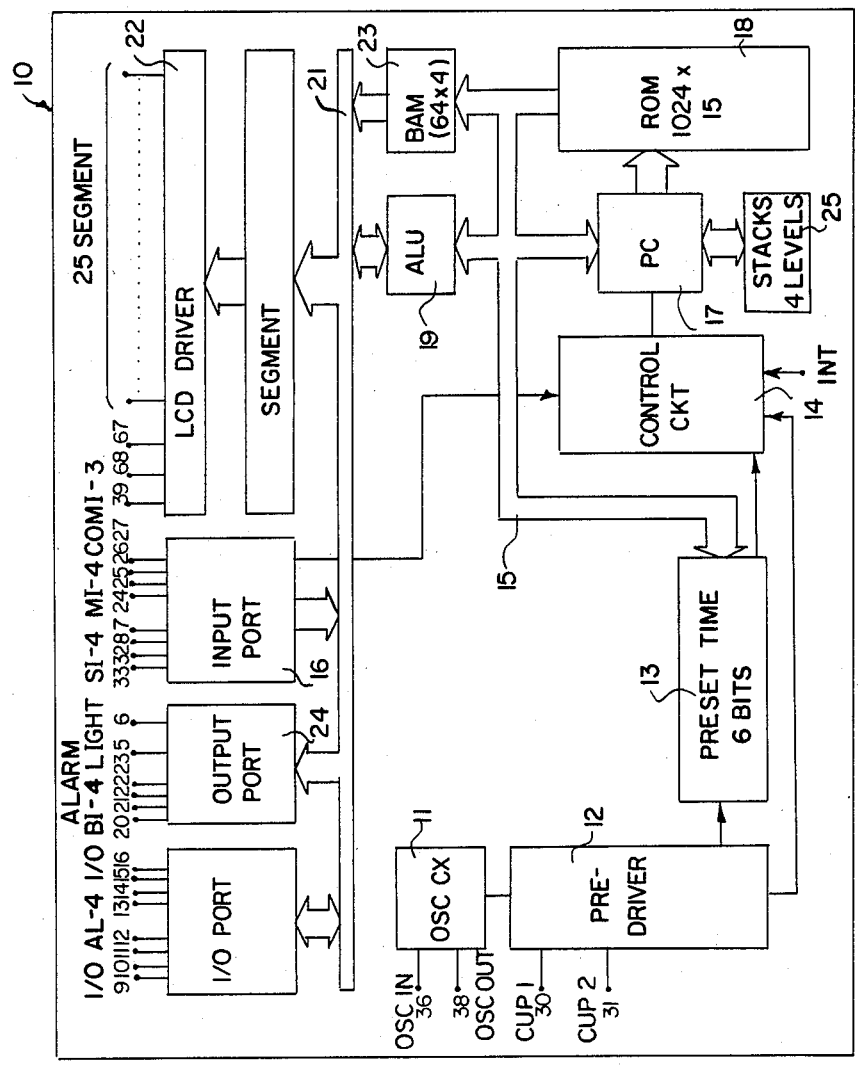
FIG. 5: Block Diagrams of Used Microswitch

Please refer to FIG. 5 that is the block diagram of equivalent circuits of the microprocessor (10) used by this invention. The device includes an oscillating pulse generator (11) as the working cycle of the microprocessor (10). The oscillating pulse generator (11) then forwards the time sequence pulse into the advance driver (12) for amplification. The amplified pulse is then sent to a preset timer (13) and a time sequence control (14). Normally, if no timing arrangement is made, the collecting panel (15) will not transmit any data into the preset timer (13). Hence, the preset timers (13) will not dispatch any signal to the time sequence control (14) in a certain period of time. Additionally, there is an input end (16) and INT interrupting signals which are able to cause the functioning of the time-sequence control (14) and further of the program counter (17). In a normal state, the function starts from 0 up and each code in the program counter (17) may be input to the read-only memory (18) as decimal location. All the codes memorized in each location will then be forwarded via the collecting panel (15) to the calculating unit ALU (19) for data computation. The computed data passes on to the collecting panel (21) and moves to the liquid-crystal drive (22), thus causing the functioning of the liquid-crystal display driver (20). Alternatively, the read-only memory (18) may have its data temporarily stored through the interim storage memory (23) or forward the data to the liquid-crystal driver (22) directly through the collecting panel (21). Both the caculating unit (19) and the interim storage memory (23) also can have its data output from the output end (24) via the collecting panel and thus cause the beeper (31) or the bulb to work. If there is any sub-program to be processed, then the read-only memory (18) will dispatch its signal to the program counter (17). This way, the 4-step lapper (25) can be controlled for the purpose of making decimal location of the sub-program.

Please refer to Diagram 4 which describes the circuit's working state of this invention. Leads 36 and 38 of the microprocessor (10) are extended to connect to an oscillating crystal (26). Due to voltage conductivity, the oscillating pulse generator (11) (please refer to Diagram 4) generates 32.768 KHz. The adjustable capacitor (27) is connected to the oscillating crystal (26). Leads 33, 32, 8 and 7 link in series the control switches S1, S2, S3 and S4 respectively to control and preset various functions. The other ends of the control switches S1, S2, S3 and S4 are connected with the right end of the voltage, i.e. $V_{DD}$. Another microswitch (28) joins in series to $V_{DD}$ and lead (64) INT and lead (65) M1's end. When a user activates the device, the microswitch (28) will generate input signals. The signals will be forwarded to the input end (16) inside the microprocessor (10) and the time sequence control (14) to cause the program counter to make a computation in line with the time sequence pulse. Leads 25, 26 and (66) have M2, M3 and M4 respectively extended to VSS1, i.e. the negative end of the cell in the form of a fixed input. So only M1 has the input of changing signals. Leads 30 and 31 have respective CUP1 and CUP2 linked to capacitor (29). Lead 5 is the output end of the beeper's signals. The signals are amplified under the co-action of the resistor R1 and transistor Q1, thereby causing the horn sounding and the output signals of lead (6) to be amplified under the action of Q2, thus causing the bulb to light. Leads 40–43, 45, and 47–63, totaling 25 leads, are the positive conducting side through which output goes to the liquid-crystal display driver (20). The negative conductance side of the liquid-crystal display driver (2) is linked with COM 1, COM 2 and COM 3. And COM 1, COM 2 and COM 3 are located at the respective negative region in contrast with the positive side. Since there is a little difference, this arrangement can make possible at most 75 ($\times$25) liquid-crystal displays.

Figure 6:
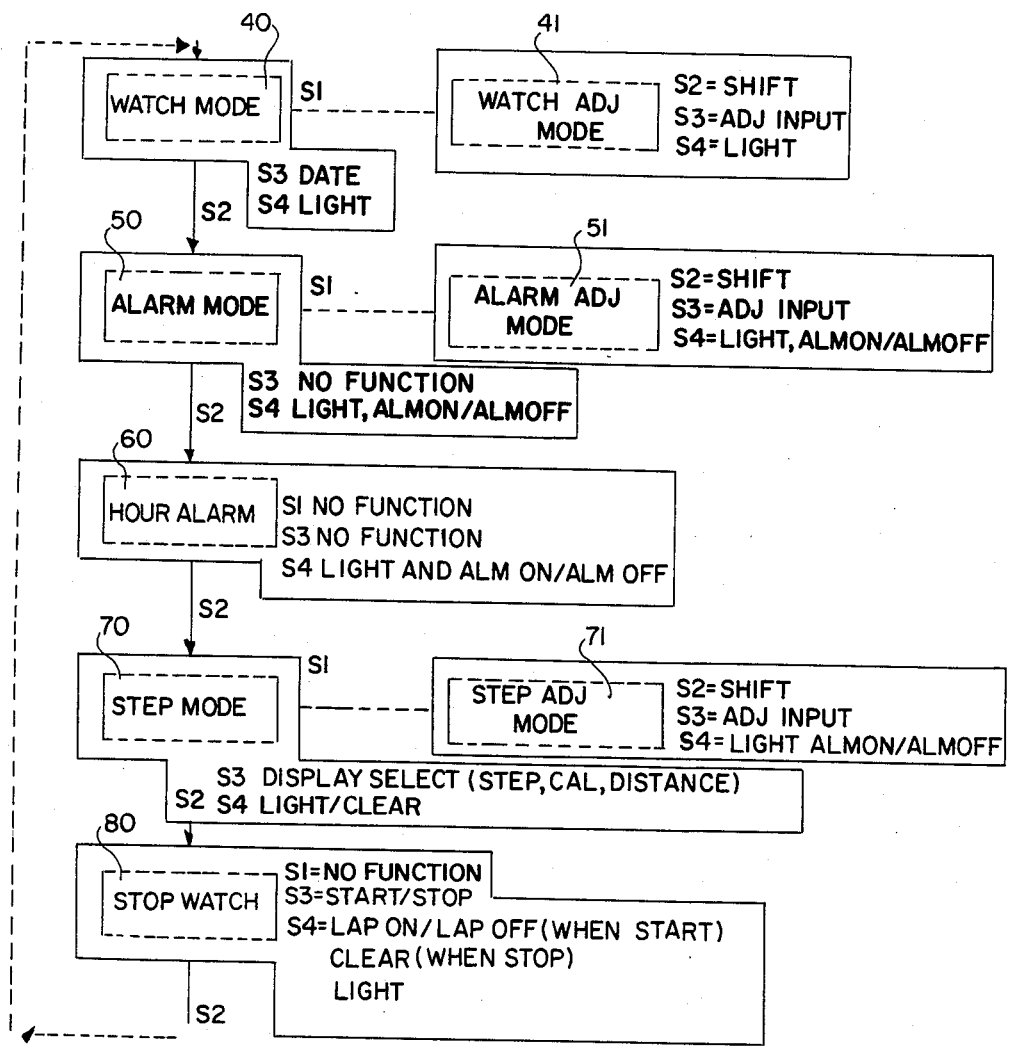
FIG. 6: Operational Flow Chart of the Control Keys.

Please refer to FIG. 6 concerning the operational flow chart of the control switch. When switchover is used for various functions, only a consecutive pressing of the control switch S2 will call up in sequence the timing function, alarming function (50), hour alarm (60), step counting function (70), stopwatch function (80), and then return to the timing function (40). Each time the control switch S2 is pressed, the liquid-crystal display driver (20) will release all the data contained in that device. In addition, when the timing function (40), alarming function (50) or step counting function (70) works, pressing of the control switch S1 will switch into day/month/week adjusting function (41), alarm adjusting function (51), or step-count adjusting function (71) respectively.

The operating methods of all the above functions are described as follows:

The liquid-crystal display (20) shows only the hour, minute and the second at the very beginning. When the control switch S3 is pressed, it will display

TIMING FUNCTION (40)

When the control switch S2 is pressed, the timing function will work. Then press the control switch S1, the "second" digits will be flashing, ready for adjusting the second. To return to zero, the control switch S3 must be pressed. After adjustment of the "second" position, press the control switch S2 and then the "hour" digits will appear and keep flashing. Then press the control switch S3 for "hour" adjustment. After the hour adjustment, press the control switch S2 and the "minute" digits will come up and remain flashing. Then press the control switch S3 for "minute" adjustment. If adjustment of the unit place of the minutes is required, press the control switch S2 and the digits of the "minute" place will be flashing. Then press the control switch S3 for "minute" adjustment.

DATE/MONTH/WEEK ADJUSTING FUNCTION (41)

Press the control switch S2 to let the "month" digits appear and flash in the display and then press the control switch S3 for "month" adjustment. After the adjustment, press the control switch S2 to let the date digits appear and flash in the display, and then press the control switch S3 for "date" adjustment. If adjustment of "week" is required, the control switch S2 must be pressed again to let the "week" digits come up and flash. Then press the control switch S3 for "week" adjustment. The function will be restored to its normal state after pressing of the control switch S2.

ALARM ADJUSTING FUNCTION (51)

Press the control switch S2 to call up the alarm function. If adjustment of the "hour" place is desired, press the control switch S1 to let the "hour" digits appear and flash. Then press the control switch S2 for "hour" adjustment. If adjustment of the "minute" place is desired, press the control switch S2 to let the "minute" digits emerge and flash and then press the control switch S3 for the "minute" adjustment. Furthermore, if adjustment of the minute of the unit place is desired, the control switch S2 must be pressed to let the minute at the unit place lay out and flash. Then press the control switch S3 for such adjustment. After the above-mentioned adjustments, press the control switch S1 to close the alarm adjusting function. (To start or stop the alarm action, the control switch S4 must be pressed and the display will come up with triangular points.)

HOUR REPORTING FUNCTION (60)

Press the control switch S2 to call for the display of the hour reporting function.

STEP COUNTING FUNCTION (70)

Press the control switch S2 to let the display display the step counting function. After step counting, press the control switch S4 return to to zero.

An alternative measure unit may be selected to measure the length of a step. Applcable units are in metric or English system. When the control switch S1 is pressed, the display will show the word "cm" or "ft". Either the English or metric system may be chosen as desired. To change from one system to another, press the control switch S3. If adjustment of the step distance is required, press the control switch S2 to let the display flashing and then press the control switch S3 to adjust for the distance of a step.

STEP-COUNT ADJUSTING FUNCTION (71)

To set desired steps, press again the control switch S2 to let the digits to the "millionth place appear and flash and then press the control switch S3 to proceed with setting up the values of desired steps. To adjust the digits to the "hundred thousandth" place, press the control switch S2 to let the digit flash and then press the control switch S3 to set up the digits of desired steps. Digits up to 7 places may be set in sequence in accordance with the operating procedures mentioned above. Finally, press again the control switch S1 to restore the step counting function.

After step counting starts, the beeper will sound as soon as the preset digits of desired steps are gained.

To call for the values of the step distance and consumed calories, press the control switch S3 to gain the total distance of strides and again press the control switch S3 to obtain the value of consumed calories.

STOP WATCH FUNCTION (80)

To show the function of the stop watch function, the control switch must be pressed. The stop watch will start timing after the control switch S3 is pressed again. To let the stop watch stop, the control switch must be once more pressed (the IC then will stop working). Finally, the control switch must be pressed if retrieval to zero is desired.

Press the control switch S3 and the stop watch will start timing. Press again the control switch S3 and the stop watch will stop timing (IC then will stop working). In case of calling for accumulated timing, press again the control switch S3 and the time will be accumulated in sequence. For retrieval to zero, press the control switch S3 to stop timing and then press the control switch S4 to get to that end.

To restore the timing function of the stop watch, press the control switch S3. Then press the control switch S4 to display the time worked out from inside. Consecutive operation is possible if the above procedures are followed. Finally, for retrieval to zero, press the control switch S3 and then the control switch S4.

I claim:

1. A pedometer comprising:
    a microprocessor having a ROM, a RAM associated with said ROM, and input and output means;
    a spring-biased pendulum associated with said input means of said microprocessor and to send electric signals through contact with said input means, said spring-biased pendulum being normally biased away from contact with said input means until jarred into contact therewith;
    display means associated with said microprocessor;
    a crystal oscillator for generating a constant frequency to said microprocessor;
    amplification means within said microprocessor for amplifying said frequency provided by said crystal oscillator;
    at least four switching means interconnecting said display means and said microprocessor for selectively supplying start, stop, and select instructions, each of said switching means being associated with said display means and said microprocessor to enable multiple functions through repeated actuations thereof to effect the display of time, date, calorie count, alarm time, stopwatch mode and step mode on said display and alarm notification through said output means.

2. The pedometer of claim 1, wherein said switching means includes a first button switch (S2) which upon consecutive depressions brings up a timing mode, an alarm mode, an hour alarm, a step counting mode, and a stop mode respectively.

3. The pedometer of claim 2, wherein said switching means further comprises a second button switch (S1) which when depressed after said depression of said first button switch (S2) enables the user to select digits representing seconds in said time mode, digits representing hours in said alarm mode, termination function in said alarm mode after adjustment of minutes of said alarm time, and measurement systems and return to step mode in said step mode.

4. The pedometer of claim 3, wherein said switching means further includes a third button switch (S3) which when depressed in said time mode after the depression of said second button switch (S1) will reset said time mode to zero and after each depression of said first button switch (S2) will adjust the hour, the minute, the month, and the week in said time mode and reset to zero, said third switch in said alarm mode acting after depression of said first switch (S2) to adjust the minute output, said third button switch (S3) in said step mode after depression of said second button switch (S1) acting to select the measurement system and after depression of said first button switch (S2) acting to adjust the step distance, said third button switch (S3) in said step mode also acting to enter the values of the desired step after said said first button switch (S2) is depressed and to provide the total distance of strides and consumed calories, said third button switch (S3) in said stop watch mode acting to start timing, stop timing, and to reset timing.

5. The pedometer of claim 4, wherein said switch means includes a fourth button switch (S4), said fourth switch serving to start and stop said alarm action in said alarm mode and in said stop watch mode subsequent to depression of said third button switch (S3), acting to reset and display the cumulative time and again after depression of said third button switch (S3) to reset the stop watch mode to zero, said fourth button switch (S4) in said step mode acting to reset said step mode to zero.

6. The pedometer of claim 1, wherein said spring-biased pendulum is comprised of a rod having two ends, one end being pivotally attached to said pedometer;
   a spring attached to said rod and biasing it away from contact with said microprocessor;
   a contact member associated with said microprocessor and acting to abut said pendulum when said pendulum is jarred from its normal position toward said microprocessor, said abutment member, said pendulum, and said microprocessor forming a closed circuit when engaged with one another.

7. A pedometer comprising:
   a microprocessor including a ROM and RAM associated therewith;
   a spring-biased pendulum associated with said microprocessor for sensing jarring motion, said pendulum being normally biased away from said microprocessor and serving to send signal means to said microprocessor upon jarring motion by abutting said microprocessor;
   a display means associated with said microprocessor;
   a crystal oscillator for generating a constant frequency to said microprocessor;
   said microprocessor including input means and output means, said output means including at least a beeper and a light;
   a pulse amplifier for amplifying said frequency from said crystal oscillator;
   a preset timer for receiving said amplified frequency and comparing it with preset data;
   a time sequence control for receiving data from said pulse amplifier, said preset timer, and said pendulum;
   a program counter connected to said time sequence control;
   input means connected to said switches and an interrupt switch connected to said pendulum, said input means acting to enable said time sequence control for feeding data into said program computer, said data then being input into said ROM as decimal locations;
   data computation unit for receiving data from said ROM and said program computer and sending said data to said display means upon adjustment of said input means and sending signals to said beeper and light upon adjustment of said input means.

* * * * *